(12) United States Patent
Pearson et al.

(10) Patent No.: US 7,784,092 B2
(45) Date of Patent: Aug. 24, 2010

(54) SYSTEM AND METHOD OF LOCATING IDENTITY PROVIDERS IN A DATA NETWORK

(75) Inventors: Larry B Pearson, San Antonio, TX (US); James M. Doherty, Georgetown, TX (US)

(73) Assignee: AT&T Intellectual I, L.P., Reno, NV (US)

( * ) Notice: Subject to any disclaimer, the term of this patent is extended or adjusted under 35 U.S.C. 154(b) by 1118 days.

(21) Appl. No.: 11/090,704

(22) Filed: Mar. 25, 2005

(65) Prior Publication Data

US 2006/0218625 A1    Sep. 28, 2006

(51) Int. Cl.
G06F 7/04 (2006.01)
G06F 15/16 (2006.01)
G06F 17/30 (2006.01)
H04L 29/06 (2006.01)

(52) U.S. Cl. .................................. 726/8; 726/4; 726/12
(58) Field of Classification Search ............... 726/4, 726/8, 12
See application file for complete search history.

(56) References Cited

U.S. PATENT DOCUMENTS

| 6,370,541 | B1* | 4/2002 | Chou et al. ............. 707/103 X |
| 6,466,917 | B1 | 10/2002 | Goyal et al. |
| 7,020,456 | B2* | 3/2006 | Smeets et al. ............... 455/411 |
| 7,103,676 | B2* | 9/2006 | Payrits et al. ............... 709/236 |
| 7,164,685 | B2* | 1/2007 | Atamaniouk ................ 370/401 |
| 7,167,705 | B2* | 1/2007 | Maes ......................... 713/168 |
| 7,207,058 | B2* | 4/2007 | Barrett ............................ 726/4 |
| 7,209,734 | B2* | 4/2007 | Maes ....................... 455/414.1 |
| 7,240,362 | B2* | 7/2007 | Pfitzmann et al. .............. 726/3 |
| 7,315,740 | B2* | 1/2008 | Maes ......................... 713/168 |
| 7,316,027 | B2* | 1/2008 | Burch et al. .................... 726/1 |
| 7,389,328 | B2* | 6/2008 | Yeung et al. ................ 709/218 |
| 7,418,485 | B2* | 8/2008 | Payrits ....................... 709/220 |
| 7,444,519 | B2* | 10/2008 | Laferriere et al. ........... 713/185 |
| 7,454,623 | B2* | 11/2008 | Hardt ......................... 713/182 |

(Continued)

FOREIGN PATENT DOCUMENTS

WO    WO 03/009246 A3    1/2003

(Continued)

OTHER PUBLICATIONS

Liberty Alliance Project, Liberty Architecture Overview, version 1.0, Jul. 2002, Liberty Alliance.*

(Continued)

*Primary Examiner*—David García Cervetti
(74) *Attorney, Agent, or Firm*—Toler Law Group

(57) ABSTRACT

A distributed computer system is disclosed and includes a plurality of identity provider servers and a plurality of service provider servers coupled to a data network. Further, an identity provider locator server is coupled to the data network. In response to a request from one of the plurality of service provider servers, the identity provider locator server can provide an identifier of at least one of the plurality of identity provider servers. The identity provider locator server can include a memory that stores a list of active identity provider servers for a particular end-user having access to the data network. Further, one or more of the plurality of identity provider servers is able to add or remove itself from the list of active identity provider servers.

14 Claims, 10 Drawing Sheets

U.S. PATENT DOCUMENTS

| | | | |
|---|---|---|---|
| 7,552,481 B2 * | 6/2009 | Moona et al. | 726/26 |
| 7,562,382 B2 * | 7/2009 | Hinton et al. | 726/2 |
| 7,565,356 B1 * | 7/2009 | Xu et al. | 707/10 |
| 7,610,390 B2 * | 10/2009 | Yared et al. | 709/229 |
| 7,631,346 B2 * | 12/2009 | Hinton et al. | 726/8 |
| 7,657,639 B2 * | 2/2010 | Hinton | 709/229 |
| 2002/0174122 A1 * | 11/2002 | Chou et al. | 707/100 |
| 2002/0184507 A1 * | 12/2002 | Makower et al. | 713/182 |
| 2003/0046391 A1 * | 3/2003 | Moreh et al. | 709/225 |
| 2003/0149781 A1 * | 8/2003 | Yared et al. | 709/229 |
| 2003/0172090 A1 * | 9/2003 | Asunmaa et al. | 707/200 |
| 2003/0177364 A1 * | 9/2003 | Walsh et al. | 713/182 |
| 2004/0064687 A1 * | 4/2004 | Pfitzmann et al. | 713/100 |
| 2004/0087336 A1 * | 5/2004 | Payrits et al. | 455/557 |
| 2004/0143521 A1 * | 7/2004 | Barnard et al. | 705/30 |
| 2004/0215824 A1 * | 10/2004 | Payrits | 709/245 |
| 2004/0250140 A1 | 12/2004 | Chavis et al. | |
| 2004/0260949 A1 * | 12/2004 | Aoki et al. | 713/201 |
| 2005/0021965 A1 | 1/2005 | Van Horn | |
| 2005/0044197 A1 * | 2/2005 | Lai | 709/223 |
| 2005/0108575 A1 * | 5/2005 | Yung | 713/201 |
| 2005/0137981 A1 * | 6/2005 | Maes | 705/44 |
| 2005/0144452 A1 * | 6/2005 | Lynch et al. | 713/170 |
| 2005/0171872 A1 * | 8/2005 | Burch et al. | 705/29 |
| 2005/0172116 A1 * | 8/2005 | Burch et al. | 713/155 |
| 2005/0188212 A1 * | 8/2005 | Laferriere et al. | 713/185 |
| 2005/0262355 A1 * | 11/2005 | Banet et al. | 713/180 |
| 2005/0268333 A1 * | 12/2005 | Betts et al. | 726/11 |
| 2005/0278547 A1 * | 12/2005 | Hyndman et al. | 713/185 |
| 2005/0283443 A1 * | 12/2005 | Hardt | 705/67 |
| 2005/0283614 A1 * | 12/2005 | Hardt | 713/182 |
| 2005/0287990 A1 * | 12/2005 | Mononen et al. | 455/411 |
| 2005/0289341 A1 * | 12/2005 | Ritola et al. | 713/168 |
| 2006/0020508 A1 * | 1/2006 | Gorti et al. | 705/14 |
| 2006/0020679 A1 * | 1/2006 | Hinton et al. | 709/217 |
| 2006/0021004 A1 * | 1/2006 | Moran et al. | 726/2 |
| 2006/0021017 A1 * | 1/2006 | Hinton et al. | 726/10 |
| 2006/0021018 A1 * | 1/2006 | Hinton et al. | 726/10 |
| 2006/0041891 A1 * | 2/2006 | Aaron | 719/315 |
| 2006/0048216 A1 * | 3/2006 | Hinton et al. | 726/8 |
| 2006/0053296 A1 * | 3/2006 | Busboom et al. | 713/182 |
| 2006/0080352 A1 * | 4/2006 | Boubez et al. | 707/102 |
| 2006/0080730 A1 * | 4/2006 | Cahill et al. | 726/8 |
| 2006/0129816 A1 * | 6/2006 | Hinton | 713/169 |
| 2006/0136990 A1 * | 6/2006 | Hinton et al. | 726/2 |
| 2006/0155842 A1 * | 7/2006 | Yeung et al. | 709/224 |
| 2006/0155993 A1 * | 7/2006 | Busboon | 713/169 |
| 2006/0156388 A1 * | 7/2006 | Stirbu et al. | 726/4 |
| 2006/0195893 A1 * | 8/2006 | Caceres et al. | 726/8 |
| 2006/0218628 A1 * | 9/2006 | Hinton et al. | 726/8 |
| 2006/0229911 A1 * | 10/2006 | Gropper et al. | 705/2 |
| 2006/0236382 A1 * | 10/2006 | Hinton et al. | 726/8 |
| 2007/0027715 A1 * | 2/2007 | Gropper et al. | 705/2 |
| 2007/0127495 A1 * | 6/2007 | de Gregorio et al. | 370/395.52 |
| 2007/0130343 A1 * | 6/2007 | Pardo-Blazquez et al. | 709/227 |
| 2007/0150511 A1 * | 6/2007 | Laguna-Macias et al. | 707/104.1 |
| 2007/0208936 A1 * | 9/2007 | Ramos Robles | 713/168 |
| 2007/0208940 A1 * | 9/2007 | Adelman et al. | 713/168 |
| 2007/0226774 A1 * | 9/2007 | Pardo-Blazquez et al. | 726/1 |
| 2007/0294431 A1 * | 12/2007 | Adelman et al. | 709/245 |
| 2008/0014931 A1 * | 1/2008 | Yared et al. | 455/432.3 |
| 2008/0016232 A1 * | 1/2008 | Yared et al. | 709/229 |
| 2008/0021997 A1 * | 1/2008 | Hinton | 709/225 |
| 2009/0259753 A1 * | 10/2009 | Hinton et al. | 709/226 |

FOREIGN PATENT DOCUMENTS

WO     WO 03/012645 A1     2/2003

OTHER PUBLICATIONS

Liberty Alliance Project, Liberty Architecture Overview, version 1.1, Nov. 2002, Liberty Alliance.*
Bajaj et al, Web Services Federation Language, Jul. 2003.*
Bajaj et al, WS-Federation: Active Requestor Profile, Jul. 2003.*
Hughes et al., Security Assertion Markup Language (SAML) 2.0 Technical Overview, Jul. 2004, Oasis.*
Hughes et al., Security Assertion Markup Language (SAML) 2.0 Technical Overview, Feb. 2005, Oasis.*
Liberty Alliance Project, Liberty Metadata Description and Discovery Specification, 2004.*
Liberty Alliance Project, Liberty ID-FF Protocols and Schema Specification, 2004.*
Liberty Alliance Project, Liberty ID-FF Architecture Overview, 2004.*

* cited by examiner

```
<script language="javascript">
function fLoginForm()
{
        var tusername = new String(document.loginForm.username.value);
        var tpassword = new String(document.loginForm.password.value);

var t1 = new RegExp(".+@.*enterprisecustomer.com$", "i");
        var t2 = new RegExp(".+@(sbcglobal.net|swbell.net|prodigy.net)$", "i");
        var t3 = new RegExp("(m[0-9][0-9][0-9][0-9][0-9]|[a-z][a-z][0-9][0-9][0-9][0-9a-
z])@([a-z][a-z]mail\.)*sbc.com$", "i");
        var t4 = new RegExp(".*@([A-Z0-9\-_]+\.)+(com|org|gov|net)$", "i");

if( (tusername.toString() == "") || (tusername.toString() == null) )
        {
                alert("User ID is blank, please try again.");
                return false;
        } if( (tpassword.toString() == "") || (tpassword.toString() == null) )
        {
                alert("Password is blank, please try again.");
                return false;
        } if( tusername.indexOf("@") < 1 )
        {
                // Local Login on this Service Provider (SP)
                document.loginForm.action = "https://www.this-SP.com/Login";
                return true;
        } if( t1.exec(tusername) != null )
        {
                // An Enterprise Customer with their own IDP
                document.loginForm.action =
                    "https://idp.enterprisecustomer.com/authn?stuff=stuff";
                return true;
        } if( t2.exec(tusername) != null )
        {
                // SBC Consumer Market Segment - iGate
                document.loginForm.action = "https://iGate.sbc.com/authn?stuff=stuff";
                return true;
        } if( t3.exec(tusername) != null )
        {
                // SBC Employee
                document.loginForm.action = "https://idp.emp.sbc.com/authn?stuff=stuff";
                return true;
        } if( t4.exec(tusername) != null )
        {
                // SBC Enterprise Market Segment - webgate
                document.loginForm.action = "https://webgate.sbc.com/authn?stuff=stuff";
                return true;
        } return true;
}
</script>
```

FIG. 8

```
<form action=" http://www.this-SP.com/LoginFailed" method="post" name="loginForm"
id="loginForm" onSubmit="return fLoginForm();">
<table cellspacing="2" cellpadding="0" border="0">
    <tr>
        <td align="right">User ID: </td>
        <td colspan="2"><input name="username" type="text" id="username" /></td>
    </tr>
    <tr>
        <td align="right">Password:</td>
        <td><input name="password" type="password" id="password" /></td>
        <td class="BodyCopyTable">
            <a href="http://www.this-SP.com/ForgotPassword">Forgot Password?</a>
        </td>
    </tr>
    <tr>
        <td align="right"> </td>
        <td><input type="submit" value="Login" /></td>
        <td class="BodyCopyTable"> </td>
    </tr>
</table>
</form>
```

SYSTEM AND METHOD OF LOCATING IDENTITY PROVIDERS IN A DATA NETWORK

FIELD OF THE DISCLOSURE

The present disclosure relates to Internet services and to locating an identity provider in a data network.

BACKGROUND

Federated identity management can be used by an Internet service provider to provide single sign-on between different portals and services. Single sign-on provides end-users with the ability to log into an initial service and move freely between affiliated services without having to login again after the first login. Once logged in to an initial parent service provider, the end-user can logoff once and automatically be logged out of all of the affiliated services. The end-user's browser session remains active as long as the end-user interacts with one of the affiliated services.

In order to have a secure single sign-on system that works with multiple service providers, single sign-on may be implemented within an identity provider server. Typically, the identity provider server can include a single sign-on username and password that is associated with each customer and is established during a registration or provisioning process. The identity provider server can also include a list of participating service provider servers that a customer can access. The list of participating service provider servers can provide a way to associate individual single sign-on accounts to specific applications or services.

In general, identity provider servers are separate from any portals and application/service provider servers. In the situation where multiple identity provider servers are included in a data network, a service provider server may not know which identity provider to use when authenticating an end-user login. As such, if the service provider server transmits the login information to the wrong identity provider server, the end-user will not be able to login.

Accordingly, there is a need an improved system and method of locating identity provider servers in a data network.

BRIEF DESCRIPTION OF THE DRAWINGS

The present invention is pointed out with particularity in the appended claims. However, other features are described in the following detailed description in conjunction with the accompanying drawings in which:

FIG. 8 is a diagram representative of a JavaScript subroutine associated with the intelligent login form of FIG. 7;

FIG. 9 is a diagram representative of a hypertext markup language (HTML) fragment associated with the intelligent login form of FIG. 7.

DETAILED DESCRIPTION OF THE DRAWINGS

Figure 1:
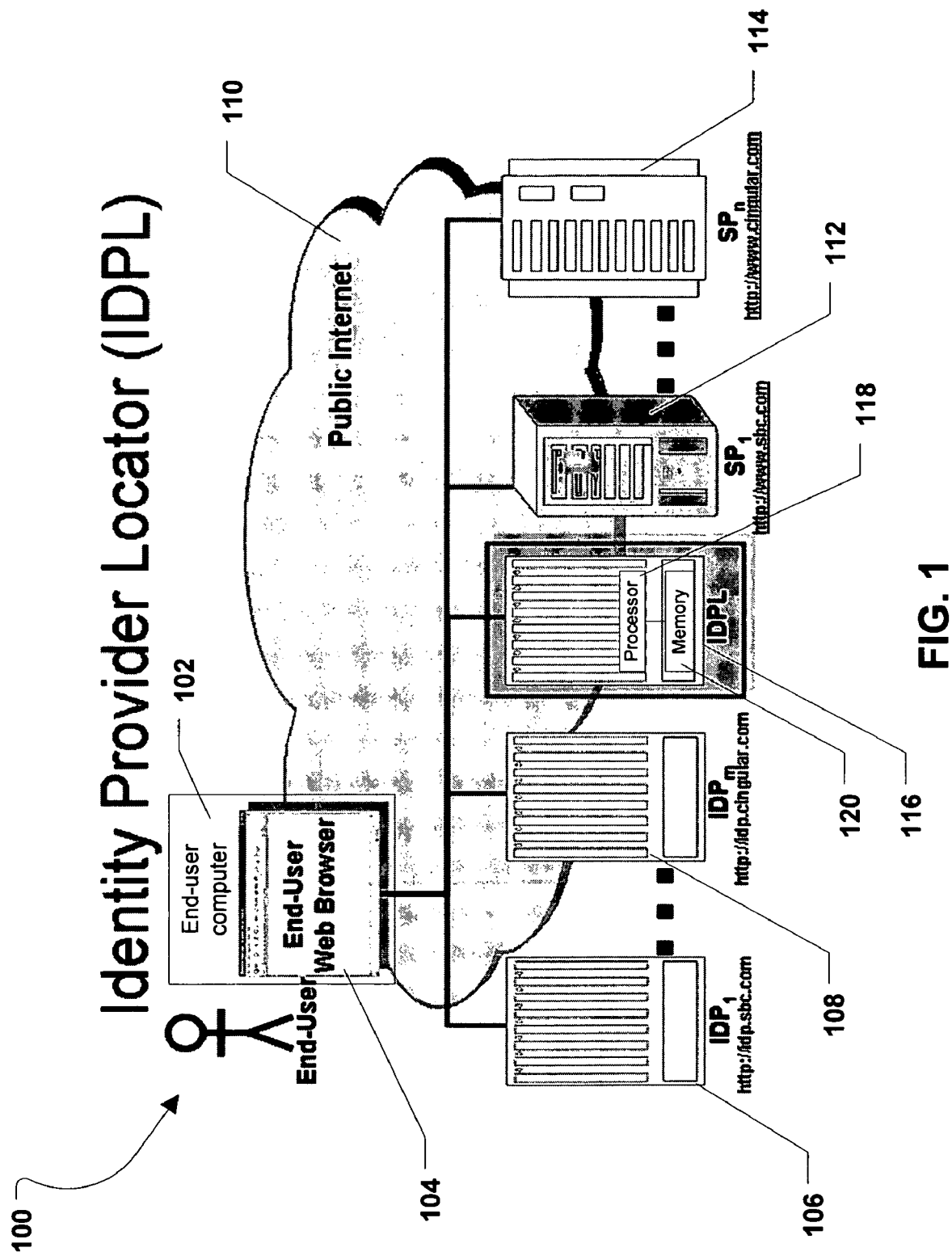
FIG. 1 is a block diagram representative of a distributed computer system including an identity provider locator server.

A distributed computer system is disclosed and includes a plurality of identity provider servers and a plurality of service provider servers coupled to a data network. Further, an identity provider locator server is coupled to the data network. In response to a request from one of the plurality of service provider servers, the identity provider locator server provides an identifier of at least one of the plurality of identity provider servers.

In a particular embodiment, the identity provider locator server includes a memory that stores a list of active identity provider servers for a particular end-user having access to the data network. Further, one or more of the plurality of identity provider servers is able to add or remove itself from the list of active identity provider servers.

In another embodiment, an identity provider locator server is disclosed and includes an interface to a data network to communicate with a plurality of identity provider servers and a plurality of service provider servers. Also, the identity provider locator server includes a processor that includes logic to respond to a request from one of the plurality of service provider server systems to identify one or more of the plurality of identity provider servers. The identity provider locator server also includes a memory that is accessible to the processor.

In yet another embodiment, a static data structure is stored within a memory of an identity provider location server. The static data structure includes a list of valid identity provider servers that may be located, a list of valid service provider servers, and a list of valid identity provider to service provider mappings.

In still another embodiment, a dynamic data structure is stored within a memory of an identity provider location server. The dynamic data structure includes a list of active sessions, a list of identity provider servers, and a list of active session to identity provider mappings.

In yet still another embodiment, a method of interacting with an identity provider locator server is disclosed and includes receiving an end-user connection request at a service provider server. The method also includes sending a redirect message including a uniform resource locator to the end-user. In this embodiment, the uniform resource locator identifies a type of request and identifies the service provider server. Further, the redirect message is sent to initiate a request to the identity provider locator server to provide a list of valid identity provider servers for use by the service provider to determine which of many identity provider servers to use to authenticate the end-user. Additionally, the method includes receiving a locate response message sent via a second redirect message. The locate response message includes an encrypted payload containing the list of active identity provider servers. In this embodiment, the method also includes authenticating the end-user using a first identity provider server in the list of active identity provider servers.

In still yet another embodiment, a method of communicating with an identity provider server is disclosed and includes receiving a request message at an identity provider locator server in response to a redirect message sent to an end-user browser from an identity provider server. The redirect message can include a request type and an identifier of the identity provider server. Further, the method includes determining if an end-user session has been previously established for the end-user by performing a query of an active session to identity provider mapping database table.

Referring to FIG. 1, a computer system is shown and is generally designated 100. As depicted, the system 100 includes an end-user computer 102. An end-user browser 104 is disposed within the end-user computer 102. In a particular embodiment, the end-user browser 104 is embedded within a computer readable medium, e.g., a memory, within the end-user computer 102. FIG. 1 illustrates that the end-user computer 102 is coupled to a first identity provider server 106, a second identity provider server (not specifically shown) and an mth identity provider server 108. In a particular embodiment, the end-user computer 102 is coupled to the first identity provider server 106 and the mth identity provider server 108 via a wide area network (WAN), e.g., the Internet 110.

FIG. 1 further shows that the end-user computer 102 is coupled to a first service provider server 112, a second service provider server (not specifically shown), and an nth service provider server 114 via the WAN, e.g. the Internet 110. Further, the end-user computer 102 is coupled to an identity provider locator (IDPL) server 116. In a particular embodiment, the IDPL server 116 includes a processor 118 and a computer readable medium, e.g., a memory 120, that is coupled to the processor 118.

In a particular embodiment, the IDPL server 116 provides services to the identity provider servers 106, 108 and the service provider servers 112, 114. In a particular embodiment, the identity provider servers 106, 108 can add or remove themselves from a list of valid active identity provider servers associated with an end-user browser session. Additionally, in a particular embodiment, the service provider servers 112, 114 are able to query the IDPL server 116 to get a list of active identity provider servers for an end-user. In a particular embodiment, the IDPL server 116 does not have knowledge of the identity of each end-user beyond the session information that the IDPL server 116 maintains with each end-user. Further, session management can be based on a single session cookie and not a persistent cookie. In a particular embodiment, the IDPL server 116 can use cookies in the same way that web servers typically use cookies to maintain session states.

In a particular embodiment, the IDPL server 116 maintains information that is relevant to its role. There are a number of different ways to store and retrieve session data. In an illustrative embodiment, the IDPL server 116 uses a model based on a relational database management system (RDBMS) that is consistent with industry standard RDBMS implementations like Oracle 9i, IBM DB2, and MySQL. In an exemplary, non-limiting embodiment, the IDPL server 116 can locate and identify valid identity provider servers that are in communication with the IDPL server 116.

Table 1 is an exemplary, non-limiting Identity Provider Database Table. The IDPL server 116 includes a list of valid identity provider servers and an identity provider row in the Identity Provider Database Table for each valid identity provider server. Table 1 lists a plurality of exemplary, non-limiting parameters that can be configured to track, identify, and communicate with valid identity provider servers. In a particular embodiment, the values of these parameters remain static after configuration and are based on the particular identity provider server associated with each parameter.

TABLE 1

Identity Provider Database Table
Identity Providers

| Column | Type | Key | Nulls | Description |
| --- | --- | --- | --- | --- |
| Identity_Provider_ID | BIGINT | Primary | No | Unique number representing an Identity Provider (IDP). |
| Name | CHAR(30) | Unique | No | The display name of the Identity Provider (IDP). |
| Domain_Name | CHAR(128) | | No | The domain name of the Identity Provider (IDP). All interactions with the IDP must be consistent with this domain name. |
| Encryption_Method | INT | | No | Indicates the encryption method to be used with the IDP. |
| Encryption_Key | CHAR(1024) | | No | Used to encrypt information being sent to the Identity Provider (IDP). |
| Decryption_Method | INT | | No | Indicates the decryption method to be used with the IDP. |
| Decryption_Key | CHAR(1024) | | No | Used to decrypt information received from the Identity Provider (IDP). |
| Participation_Start_Date | DATETIME | | No | The date and time that the Identity Provider (IDP) may start using Identity Provider Locator server (IDPL) services. |
| Participation_Stop_Date | DATETIME | | Yes | The date and time that the Identity Provider (IDP) is no longer eligible to use Identity Provider locator (IDPL) services. When NULL, there is no stop date. |

Also, in a particular embodiment, the IDPL server 116 includes a list of valid service provider servers that are in communication with the IDPL server 116. The IDPL server 116 also includes a row in the Service Provider Database Table for each valid service provider server. Table 2 depicts an exemplary, non-limiting Service Provider Database Table and lists a plurality of exemplary, non-limiting parameters that can be configured to locate and communicate with the valid service provider servers. The values of these parameters are based on the particular service provider server associated with each parameter. Further, in a particular embodiment, after these values are configured they remain substantially static.

identity provider to service provider mapping. Table 3 depicts an exemplary, non-limiting Identity Provider to Service Provider Mapping Database Table that shows a plurality of exemplary, non-limiting mapping parameters that can be configured to provide a mapping between a valid identity provider server and a valid service provider server. In a particular embodiment, once the parameters are configured they remain substantially static.

Further, in a particular embodiment, the IDPL server 116 does not provide a service provider server with a list of identity provider servers supporting end-user sessions when the identity provider servers are not valid for the service provider

TABLE 2

Service Provider Database Table
Service Providers

| Column | Type | Key | Nulls | Description |
|---|---|---|---|---|
| Service_Provider_ID | BIGINT | Primary | No | Unique number representing a Service Provider (SP). |
| Name | CHAR(30) | Unique | No | The display name of the Service Provider (SP). |
| Domain_Name | CHAR(128) | | No | The domain name of the Service Provider (SP). All SP interactions must be consistent with this domain name. |
| Encryption_Method | INT | | No | Indicates the encryption method to be used with the SP. |
| Encryption_Key | CHAR(1024) | | No | Used to encrypt information being sent to the Service Provider (SP). |
| Decryption_Method | INT | | No | Indicates the decryption method to be used with the SP. |
| Decryption_Key | CHAR(1024) | | No | Used to decrypt information received from the Service Provider (SP). |
| Participation_Start_Date | DATETIME | | No | The date and time that the Service Provider (SP) may start using Identity Provider Locator (IDPL) services. |
| Participation_Stop_Date | DATETIME | | Yes | The date and time that the Service Provider (SP) is no longer eligible to use Identity Provider locator (IDPL) services. When NULL, there is no stop date. |

In a particular embodiment, the IDPL server 116 provides valid mappings between valid identity provider servers and valid service provider servers that are in communication with the IDPL server 116. The IDPL server 116 includes a list of valid identity provider to service provider mappings. Further, the IDPL server 116 includes a database table for each valid servers. Further, in a particular embodiment, when the IDPL server 116 sends a list of valid identity provider servers to a particular service provider server, the identity provider server tracking parameters can be matched with identifiers used internally by the service provider server in order to identify specific identity provider servers.

TABLE 3

Identity Provider to Service Provider Mapping Database Table
Identity Provider To Service Provider Mappings

| Column | Type | Key | Nulls | Description |
|---|---|---|---|---|
| Mapping_ID | BIGINT | Primary | No | Unique number representing an Identify Provider (IDP) to Service Provider (SP) mapping. |
| Identity_Provider_ID | BIGINT | Foreign Alternate | No | The Identity Provider ID in the mapping. Referential integrity is enforced. Can't have an invalid Identity Provider ID (one that isn't in the Identity Provider database table). |
| IDP_Known_As | CHAR(128) | | No | A string representation of how this Service Provider (SP) knows this Identity Provider (IDP). |

TABLE 3-continued

Identity Provider to Service Provider Mapping Database Table
Identity Provider To Service Provider Mappings

| Column | Type | Key | Nulls | Description |
| --- | --- | --- | --- | --- |
| Service_Provider_ID | BIGINT | Foreign Alternate | No | The Service Provider ID in the mapping. Again, referential integrity is enforced. Can't have invalid Service Provider ID's in this database table that aren't in the Service Provider database table. |
| SP_Known_As | CHAR(128) | | No | A string representation of how this Identity Provider (IDP) knows the Service Provider (SP). |
| Link_Start_Date | DATETIME | | No | The date and time that this mapping becomes valid. |
| Link_Stop_Date | DATETIME | | Yes | The date and time that this mapping is no longer valid. When NULL, there is no stop date. |

Figure 2:
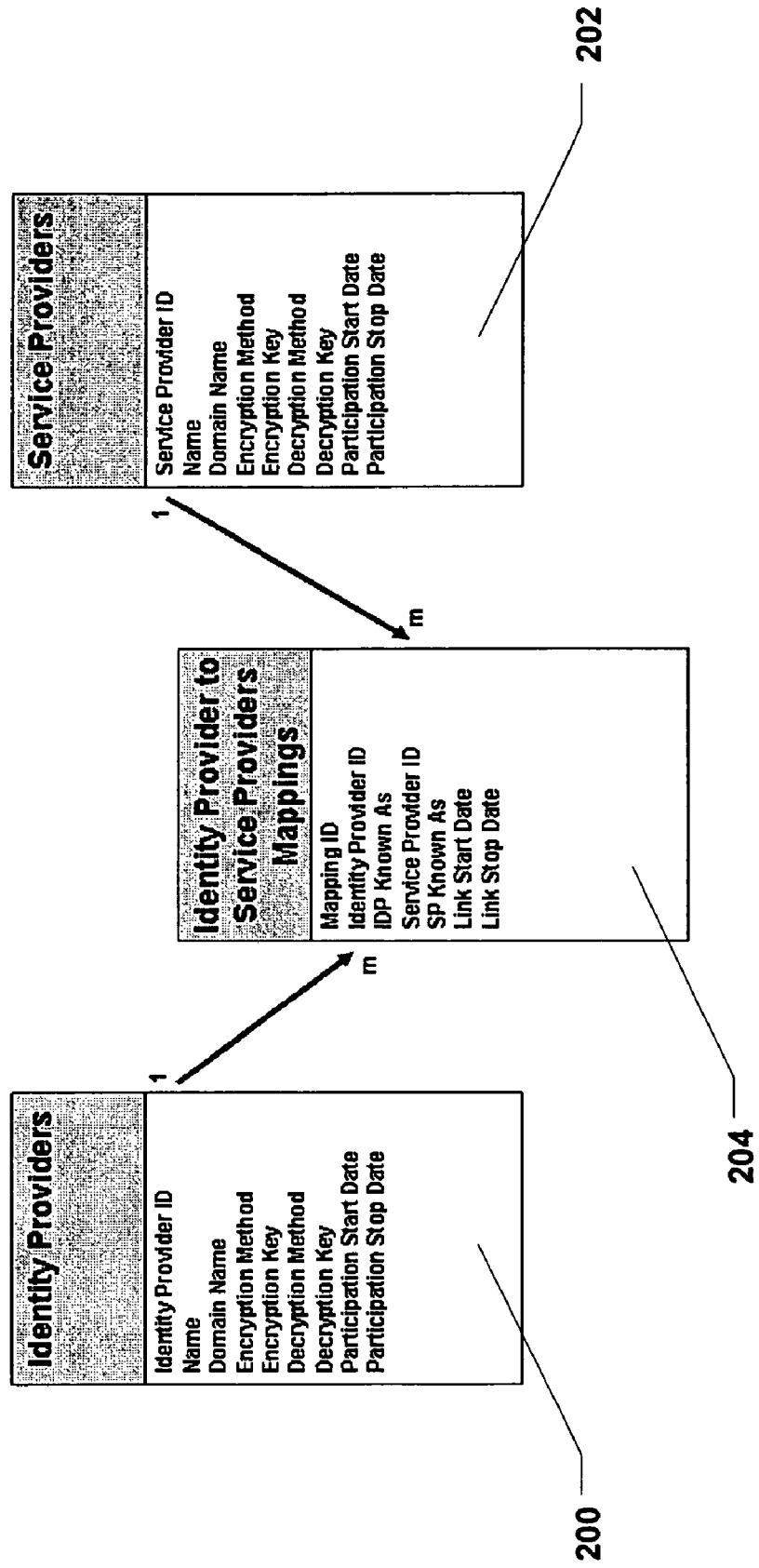
FIG. 2 is a diagram illustrating the relationships between a plurality of static database tables within an identity provider locator server.

In a particular embodiment, the values of the parameters in the above database tables for each identity provider server and service provider server remain relatively static during the operation of the IDPL server 116. Once the values of these parameters are configured, by a system manager, e.g., an identity provider server manager or a service provider server manager, the values of those parameters do not change very often. FIG. 2 illustrates static database table relationships between an Identity Provider Database Table 200, a Service Provider Database Table 202, and an Identity Provider to Service Provider Mapping Database Table 204.

In a particular embodiment, the IDPL server 116 maintains a session with each end-user browser. Further, in a particular embodiment, the end-user browser sessions are stored and tracked using a Relational Database Management System (RDMS). In a particular embodiment, active sessions are stored and tracked using the following method. When an end-user browser accesses a web server, before the web server sends any HTML or redirect messages back to the end-user browser, the web server requests the contents of a cookie. If the cookie is present, the contents contain a session identifier that is unique to that specific end-user browser session. If the cookie is not present, a new session is created in the web server for that end-user and a cookie identifying the session is sent to the end-user browser. Table 4 depicts an Active Session Database Table and lists a plurality of exemplary, non-limiting parameters that can be configured to allow the IDPL server 116 to store dynamic session information for active end-users in communication with the IDPL server 116. The values of the parameters shown in Table 4 are populated dynamically as a result of end-user browser redirects to the IDPL server 116 from identity provider servers and service provider servers.

TABLE 4

Active Session Database Table
Active Sessions

| Column | Type | Key | Nulls | Description |
| --- | --- | --- | --- | --- |
| Active_Session_ID | BIGINT | Primary | No | Unique number representing an active session on the IDPL. |
| Active_Session_String | CHAR(1024) | Unique Alternate | No | The active session key as stored in the browser's cookie. This session identifier is a randomly generated string with a minimum length of 128 and a maximum length of 1024. These session identifiers are generated in the normal way. |
| Session_Start | TIMESTAMP | | No | The timestamp (date/time) that the session was initiated. |
| Session_Refreshed | TIMESTAMP | | No | The timestamp (date/time) that the session was last used by the end-user. At session start, this value is the same as the Session_Start value. Every time browser "hits" the IDPL, this value is updated to the current date/time (now( )). This value is used to identify session timeouts. Whenever the Session Refreshed value plus the timeout value is greater than the current date/time, the session and all associated data is deleted. |

Figure 3:
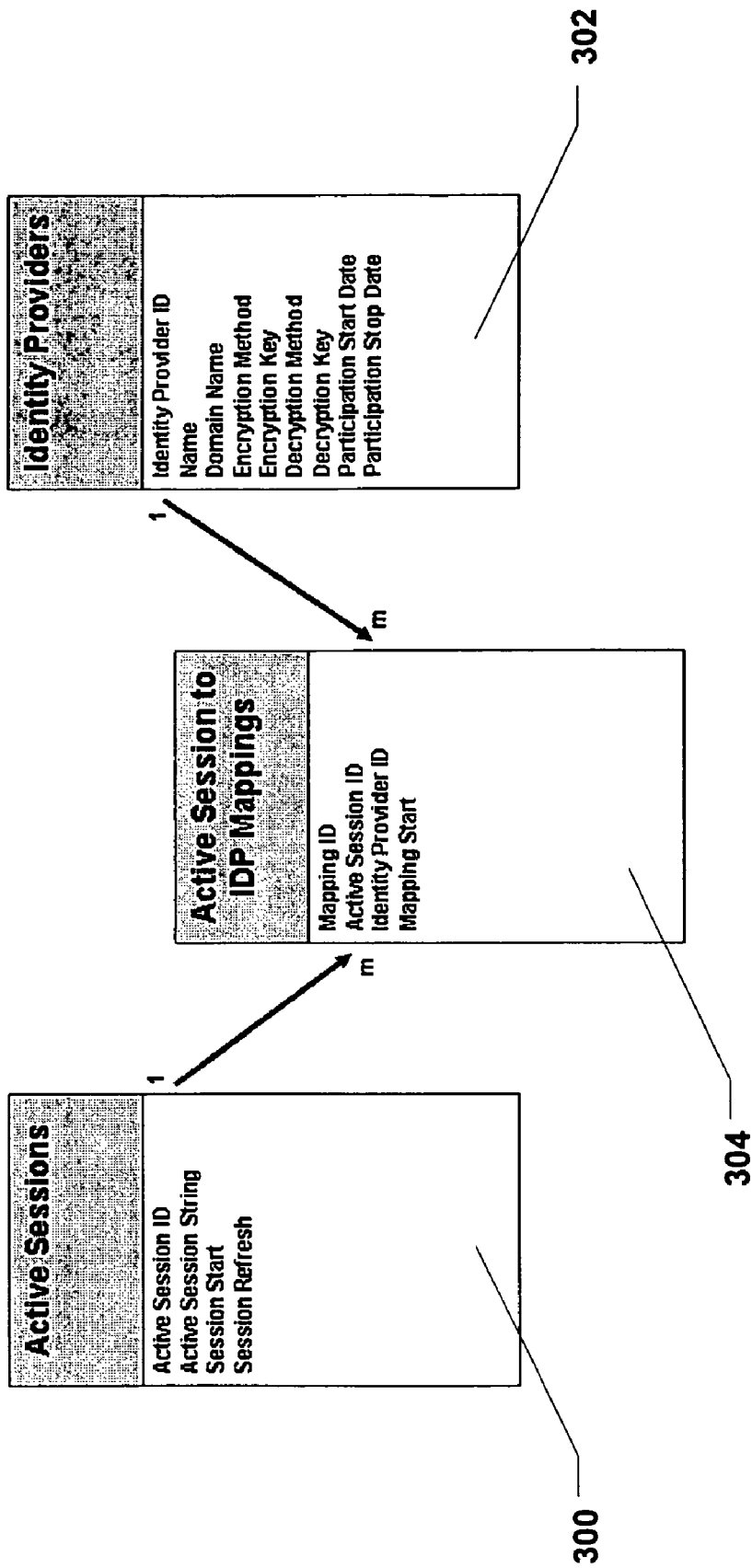
FIG. 3 is a diagram illustrating the relationships between a plurality of dynamic database tables and a static database table within an identity provider locator server.

In addition to the session information that is tracked using the parameters listed in Table 4, the IDPL server 116 can provide mappings to valid identity provider servers associated with end-user sessions. Table 5 illustrates an Active Session to Identity Provider Mapping Database Table and includes a plurality of parameters that can be used to configure mappings between valid identity provider servers and end-user sessions. Table 5 can be dynamically populated as a result of end-user browser redirects containing identity provider server commands that are encoded within redirect universal resource locator servers (URLs). FIG. 3 illustrates the relationship between an Active Session Database Table 300, an Identity Provider Database Table 302, and an Active Session to Identity Provider Mapping Database Table 304. As shown, the Active Session Database Table 300 and the Identity Provider Database Table 302 communicate with the Active Session to Identity Provider Mapping Database Table 304.

has a valid login session. In the event that the end-user does not have a login session, the first service provider server determines which identity provider server within a plurality of identity provider servers to use to authenticate the end-user.

Moving to step 404, the first service provider server responds to the end-user browser with a redirect message, e.g., https://www.IDPL.com/LocateRequest?SP-ID=SP1&{Encrypted Payload}. In a particular embodiment, the redirect message is designed to request a list of valid identity provider servers from the IDPL. In a particular embodiment, the redirect message can use secure socket layer (SSL) so that the request cannot be easily captured by unknown third parties. In an illustrative embodiment, the redirect URL provides information on the type of request (Locate Request), a service provider server identifier, and an encrypted payload, e.g., a security assertion markup language (SAML) assertion. The service provider server identifier can

TABLE 5

Active Session to Identity Provider Mapping Database Table
Active Session To Identity Provider Mappings

| Column | Type | Key | Nulls | Description |
|---|---|---|---|---|
| Mapping_ID | BIGINT | Primary | No | Unique number representing session to IDP mapping on the IDPL. |
| Active_Session_ID | BIGINT | Foreign Alternate | No | Foreign key reference to Active Sessions database table indicating which session. |
| Identity_Provider_ID | BIGINT | Foreign | No | Foreign key reference to Identity Provider database table indicating which Identity Provider (IDP). |
| Mapping_Start | TIMESTAMP | | No | The timestamp (date/time) that this mapping was created or updated by an Identity Provider (IDP). Needed to be able to provide an ordered list of active Identity Provider (IDP) in most recent first order to a Service Provider (SP) requesting the list of active Identity Provider (IDP). Needed to be consistent with the Liberty ID-FF Identity Provider Introduction profile. |

Figure 4:
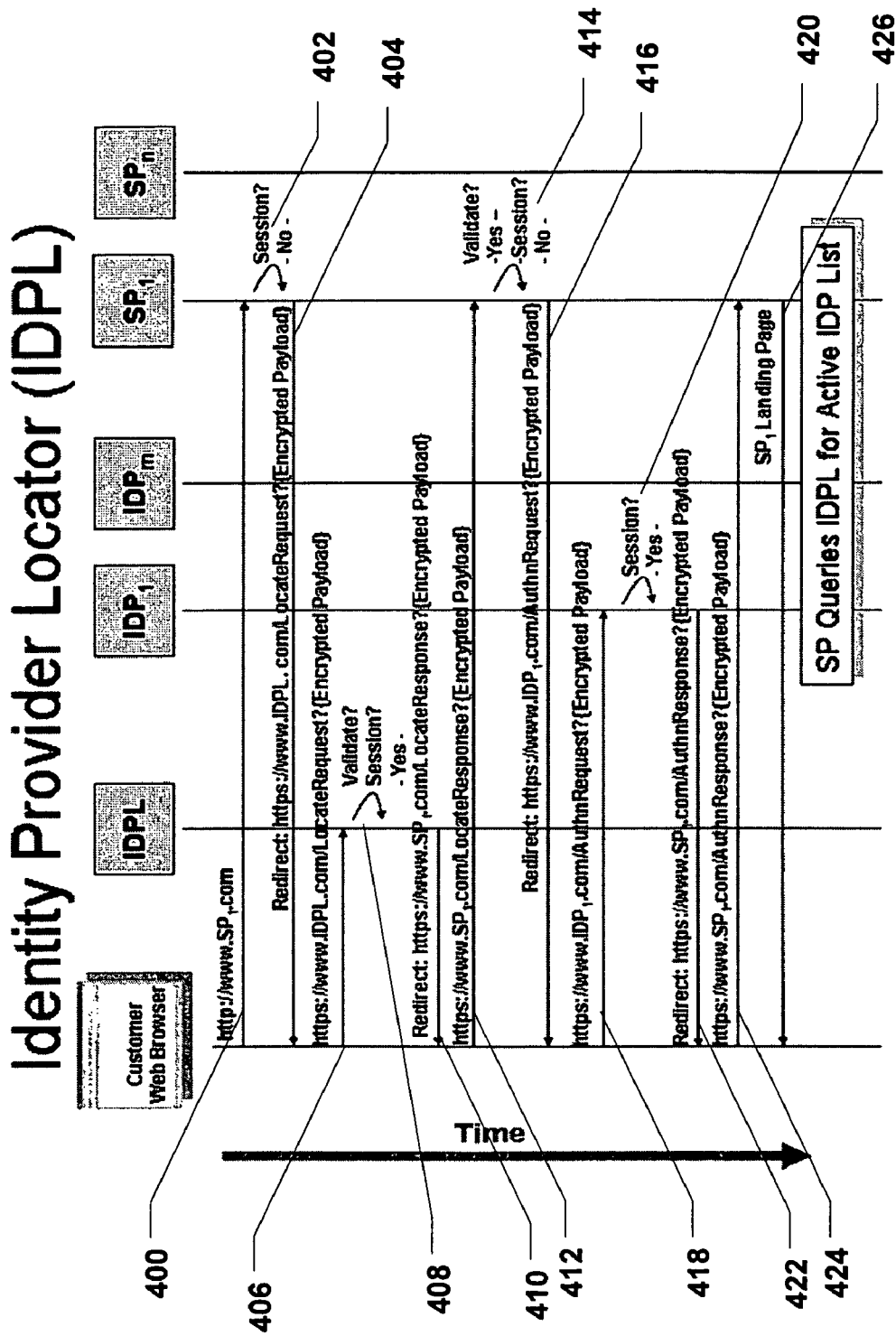
FIG. 4 is a ladder diagram to illustrate a method of querying an identity provider locator server for a list of active identity provider servers.

FIG. 4 shows a method of querying an IDPL server for a list of active identity provider servers. As shown, the method is depicted as a ladder diagram. In a particular embodiment, the method operates under the assumption that the end-user has an active single sign-on session with at least one identity provider server. Further, the method operates under the assumption that the IDPL server has been configured with the correct identity provider to service provider mapping parameters in the static configuration database tables, described above. Additionally, the method operates under the assumption that at least one identity provider server that is listed in an IDPL server dynamic Active Session Database table, described above, is for the particular end-user referred to during the description of the method. The method also operates under the assumption that cookies are used to manage end-user browser sessions. However, in a particular embodiment, cookie exchanges between each of the servers and the end-user browser are not explicitly shown in FIG. 2.

Commencing at step 400, the end-user attempts to access a protected application or service provided at a web site provided by a first service provider server. In a particular embodiment, the end-user can select a link or type a URL into the end-user browser, e.g., http://www.SP1.com. At step 402, the first service provider server determines whether the end-user indicate to the IDPL server a particular service provider server that is making the request. The IDPL server can compare the service provider server identifier to values listed in a Service Provider Database Table within the IDPL server in order to identify the service provider server. In a particular embodiment, the encrypted payload contains a time stamp and a fully qualified domain name (FQDN). The time stamp can be used to make replay attacks harder. The FQDN can be compared with the values within the Service Provider Database Table in order to validate the domain name. The IDPL server can use a Decryption Method and Decryption Key from the Service Provider Database Table to decrypt the encrypted payload.

Proceeding to step 406, the end-user browser acts on the redirect message and accesses the IDPL server. The IDPL server uses cookies to get session information or create a new session. If a session already exists, the cookie exchange will yield a session identifier that matches the value in the Active Session String column of the Active Sessions Database Table. The Session Refresh column in the Active Sessions Database Table is updated to reflect the current time. If a session doesn't already exist, a cookie is placed on the end-user browser containing a new unique random session identifier. This session identifier is inserted into the Active Sessions Database Table along with the current date/time in both the Session Start and Session Refresh columns. If a session already exists, the Session Refresh column in the Active Sessions Database Table is updated with the current date/time.

At step 408, the IDPL server decodes the URL into the request type (Locate Request), the service provider server identifier to identify the service provider server that is making the request, and the encrypted payload. In a particular embodiment, the service provider server identifier is used to access the service provider Database Table using the Name column. Also, in a particular embodiment, the Decryption Method and Decryption Key are used to decrypt the encrypted payload into a timestamp and a fully qualified domain name (FQDN). If the service provider server identifier or the encrypted payload is invalid, the IDPL server responds to the end-user browser with a hypertext markup language (HTML) page to indicate to the end-user that an error has occurred.

Moving to step 410, the IDPL server transmits a redirect URL to the end-user browser, e.g., https://www.SP1.com/LocateResponse?{Encrypted Payload}. In a particular embodiment, the IDPL server creates a Locate Response in the form of a redirect using the FQDN provided in the encrypted payload of the request. Additionally, the URL used in the redirect contains the FQDN, a Locate Response indicator, and an encrypted payload. The encrypted payload can be encoded using the SAML specification. In a particular embodiment, the encrypted payload is encrypted using the Encryption Method and Encryption Key from the corresponding service provider server entry in the Service Provider Database Table. The payload contains a timestamp and an ordered list of identity provider servers. When there are no identity provider servers associated with the end-user session, the list has zero elements in it.

In a particular embodiment, the identity provider server list is ordered so that the most recent identity provider server associated with the end-user is shown first. In other words, the list is in descending order of the Active Session to Identity Provider Mappings Database Table Mapping Start column. In the present example, the first identity provider server is registered as the most recent identity provider server. Therefore, the first identity provider server is the first identity provider server on the list. In a particular embodiment, an identity provider server can only be provided when the identity provider server has registered itself as an identity provider server for this end-user on the IDPL server and when the IDPL server static configuration database tables have a valid mapping between first service provider server and the first identity provider server.

Continuing to step 412, the end-user browser receives the redirect request, e.g., https://www.SP1.com/LocateResponse?{Encrypted Payload}. Then, the end-user browser automatically redirects to the first service provider server and delivers the locate response message from the IDPL server to the first service provider server. In a particular embodiment, the first service provider server uses a cookie exchange to associate this particular inbound request with a session. At step 414, the first service provider server decodes and validates the locate response message. The first service provider server decrypts the encrypted payload and validates the timestamp to be within specification to guard against a replay attack. As stated above, the returned identity provider server list contains the first identity provider server as the first entry in the ordered list.

In a particular embodiment, the first service provider server determines whether the end-user has a valid login session or not. Typically, the first service provider server would not have made the original locate request if the end-user was already authenticated. However, this validation is performed to verify that nothing abnormal is occurring. If the user already has a login session on the first service provider server, then the first service provider server returns an error message to the end-user and closes the session. If the end-user does not have a valid login session, the first service provider server authenticates the end-user using the first identity provider server returned by the IDPL server in the identity provider server list. In this case, the first identity provider server is the first identity provider server on the identity provider server list.

Proceeding to step 416, the first service provider server transmits a redirect to the end-user browser, e.g., https://www.IDP1.com/AuthnRequest?{Encrypted Payload}. In a particular embodiment, the first service provider server creates a standard ID-FF authentication request and redirects the end-user browser to the correct identity provider server. The format of the encrypted payload is set by the ID-FF protocol. In an alternative embodiment, if a different federated identity management protocol is used, the format of the authentication request conforms to that protocol. At step 418, the end-user browser receives the authentication request generated by the first service provider server, e.g., https://www.IDP1.com/AuthnRequest?{Encrypted Payload}, and forwards it to the first identity provider server.

Next, at step 420, the first identity provider server determines that the end-user has a valid login session. If the end-user does not have a valid login session, the first identity provider server challenges the end-user for a username and password, i.e., credentials, before moving to step 422. At step 422, the first identity provider server formulates a redirecting authentication response, e.g., https://www.SP1.com/AuthnResponse?{Encrypted Payload} and sends it back to the end-user browser. Then, at step 424, the end-user browser forwards the identity provider server authentication response to first service provider server. The first service provider server decodes the response and creates a login session for the end-user. At step 426, the first service provider server transmits a landing page, e.g., a first HTML page, to the end-user browser.

In a particular embodiment, an end-user may be active on multiple identity provider servers and the authentication request from the service provider server may fail when the request is made to the first identity provider server on the identity provider server list. In such a case, the service provider server continues making an authentication request using the next identity provider server in the list until the list is exhausted. This case can occur when the accounts on the identity provider server and the service provider server are not been linked. When none of the listed identity provider servers will authenticate the end-user and when the service provider server supports local logins, the service provider server can present the end-user with an intelligent login form, shown in FIG. 7.

Figure 5:
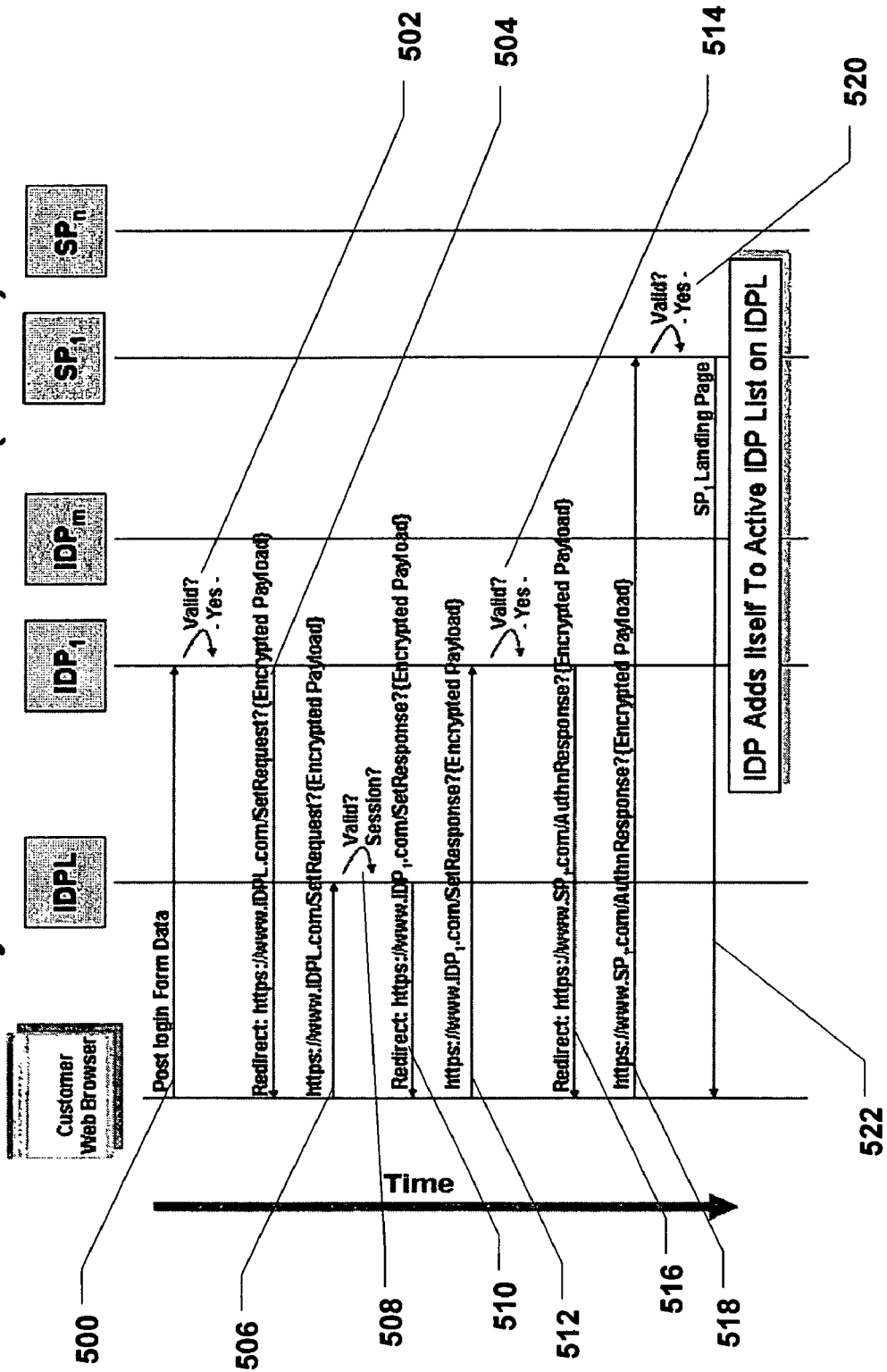
FIG. 5 is a ladder diagram to illustrate a method of adding identity provider servers to a list of valid identity provider servers at an identity provider locator server.

Referring to FIG. 5, a method of adding identity provider servers to a list of valid identity provider servers at an IDPL server is illustrated as a ladder diagram. The method shown in FIG. 5 operates under the assumption that an end-user has provided authentication information to an identity provider server and that cookies are used to manage end-user browser sessions. The method shown in FIG. 5 does not document cookie exchanges.

Beginning at step 500, the end-user browser posts login form data to an identity provider server, e.g., the first identity provider server. In a particular embodiment, the login form data includes a username and a password. Prior to the end-user browser posting the login form data to the identity provider server, a service provider server requests authentication service from an identity provider server (AuthnRequest). If the identity provider server does not already have a valid login session, the identity provider server will request authentication credentials from the end-user. On the other hand, if the end-user already has a valid session on the identity provider server, then step 500 is omitted. At step 502, a first identity provider server validates a username and password received with the login form data. If the username and password is correct, the method continues to step 504. Otherwise, if the username and password is incorrect, the first identity provider server sends the end-user browser an appropriate error message. If the end-user already has a session on the identity provider server, steps 500 and 502 are omitted.

Moving to step 504, the first identity provider server sends a redirect message to the end-user browser, e.g., https://www.IDPL.com/SetRequest?IDP-ID=IDP1&{Encrypted Payload}. In a particular embodiment, the redirect message is for the IDPL server and contains the request type (Set Request), and an identifier for the first identity provider server that matches the configuration information in the Name column of the Identity Provider Database Table within the IDPL server. Further, in a particular embodiment, the information within the Identity Provider Database Table is used to determine the decryption method and decryption key to be used to decrypt the encrypted payload. In a particular embodiment, the encrypted payload contains a date stamp, a time stamp, and the domain name to which a response is to be directed. The time stamp value can be used to determine whether the request is a replay attack. For example, if the current time on the IDPL server is greater than the time stamp plus a timeout value, the request is rejected and a suitable error message is sent to the end-user. Additionally, if the response domain name does not match the Domain Name column in the Identity Provider Database Table, the request is rejected and a suitable error message is sent to the end-user.

Continuing to step 506, the end-user browser delivers the redirect message, e.g., https://www.IDPL.com/SetRequest?IDP-ID=IDP1&{Encrypted Payload}, to the IDPL server. Next, at step 508, the IDPL server performs a validation of the encoded URL. If the encoded URL is valid, the IDPL server continues processing the request. On the other hand, if the encoded URL is not valid, an error message is returned to the end-user browser and processing stops. Then, the IDPL server determines whether the end-user has a current session. If a current session does not exit, one is created. In a particular embodiment, the creation of a session includes creating an entry in the Active Session Database Table for this particular end-user. If the end-user has a current session, the Session Refresh column is updated with the current date and time.

In a particular embodiment, this information is pulled from the Active Sessions Database Table. Further, in a particular embodiment, a query is performed against the Active Session to Identity Provider Mapping Database Table in order to determine whether the first identity provider server is already associated with this end-user session. If the end-user is already associated with the first identity provider server, the Mapping Start column is updated with the current time stamp in the Active Session to Identity Provider Mapping Database Table. Otherwise, an entry is added to the Active Session to Identity Provider Mapping Database Table that maps the first identity provider to this particular end-user.

Moving to step 510, the IDPL server redirects the end-user browser back to the first identity provider server by transmitting an encoded URL to the end-user browser. For example, the IDPL server transmits https://www.IDP1.com/SetResponse?{Encrypted Payload} to the end-user browser.

In a particular embodiment, the encoded URL includes the identity provider server domain name, the request type (Set Response), and an encrypted payload. Further, in a particular embodiment, the encrypted payload contains a time stamp to guard against replay attacks. Next, at step 512, the end-user browser sends the encoded URL response, e.g., https://www.IDP1.com/SetResponse?{Encrypted Payload}, to the first identity provider server.

Continuing to step 514, the first identity provider server decodes and validates the response message. If the response message is invalid, processing stops and the first identity provider server sends an error response message to the end-user browser. When the response is valid, the rest of the processing conforms to the existing ID-FF protocol specification for communicating an authentication response back to the first service provider server. At step 516, the IDPL server sends a redirect message to the end-user browser.

In a particular embodiment, the redirect message is: https://www.SP1.com/AuthnResponse?(Encrypted Payload}. Thereafter, at step 518, the end-user browser transmits the redirect message to the first service provider server. Moving to step 520, the first service provider server determines that the redirect message is valid. In a particular embodiment, the first service provider server performs normal ID-FF validation of the first identity provider server authentication response. At step 522, the first service provider server transmits a landing page to the end-user browser.

Figure 6:
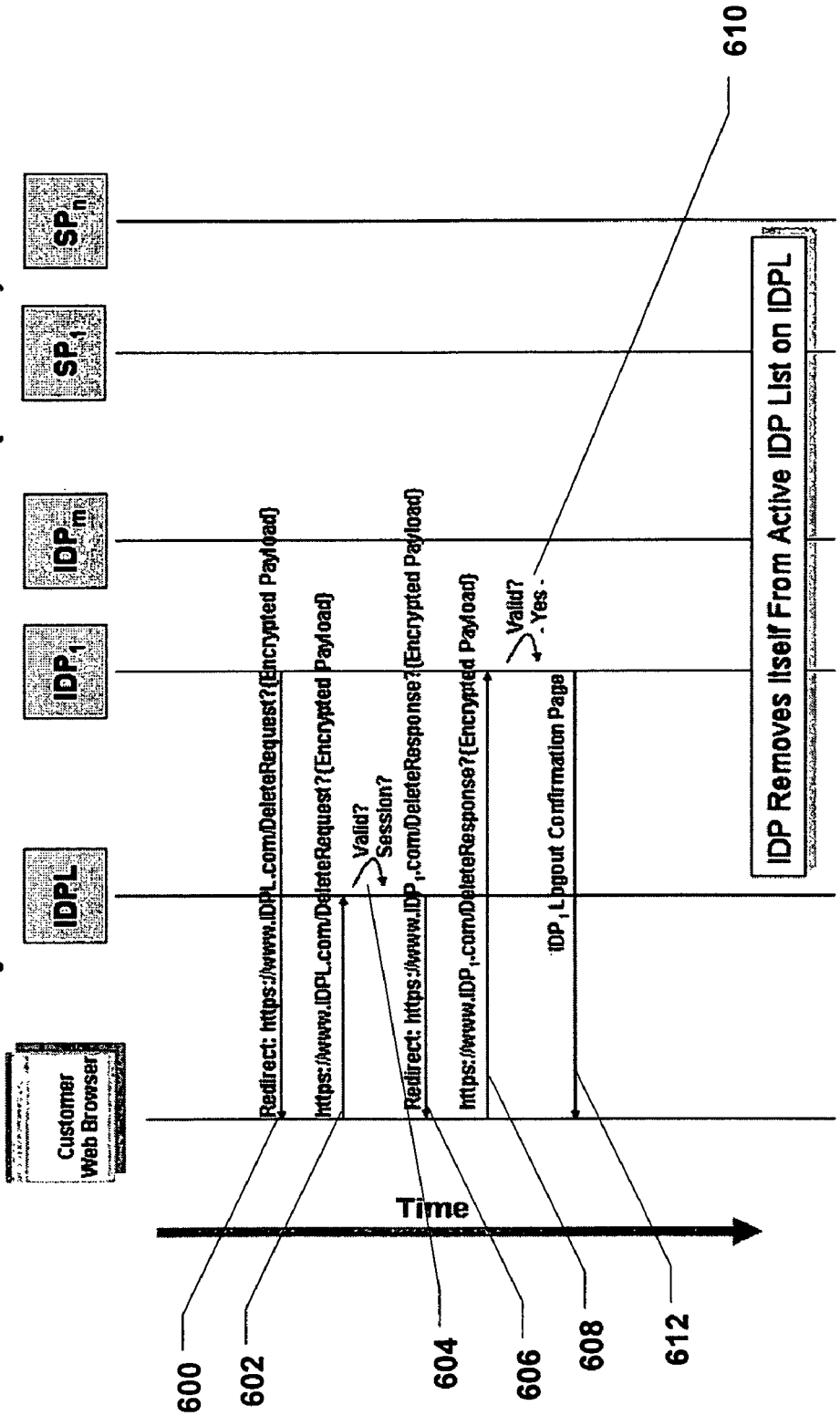
FIG. 6 is a ladder diagram to illustrate a method of removing identity provider servers from a list of valid identity provider servers at an identity provider locator server.

Referring to FIG. 6, a method of removing an identity provider server from a list of active identity provider servers within the IDPL server is depicted as a ladder diagram. In a particular embodiment, the method operates under the assumption that the end-user has a valid session on both an identity provider server, e.g., the first identity provider server, and an IDPL server. Further, the method operates under the assumption that the end-user has initiated a single logout at the first identity provider server and that the first identity provider server has completed an ID-FF logout sequence except for the last step in which single sign-out confirmation is been sent to the end-user. Also, in general, end-user browser cookie exchanges are not described during the description of the method illustrated in FIG. 6.

Commencing at step 600, the first identity provider server sends a redirect message to the end-user browser. For example, the redirect message is the following: https://www.IDPL.com/DeleteRequest?IDP-ID=IDP1&{Encrypted Payload}. In a particular embodiment, the redirect message is for the IDPL server and contains the request type (Delete Request) and an identifier for the first identity provider server that matches one of the values within the Name column of the Identity Provider Database Table.

Further, in a particular embodiment, the information within the Identity Provider Database Table is used to determine the decryption method and decryption key that is used to decrypt the encrypted payload. Also, the encrypted payload contains a date and time stamp and the domain name to which a response is to be directed. In a particular embodiment, the time stamp value is used to determine whether a particular request is a replay attack. For example, if the current time on the IDPL server is greater than the time stamp plus a timeout value, the request is rejected and a suitable error message can be sent to the end-user. Additionally, in a particular embodiment, if the response domain name does not match the Domain Name column in the Identity Provider Database Table, the request is also rejected and a suitable error message is sent to the end-user.

Proceeding to step 602, the end-user browser delivers the delete request, e.g., https://www.IDPL.com/DeleteRequest?

IDP-ID=IDP1&{Encrypted Payload}, to the IDPL server. At step 604, the IDPL server performs a validation of the encoded URL. If the encoded URL is valid, the IDPL server continues processing the request. On the other hand, if the encoded URL is not valid, an error message is returned to the end-user browser and processing stops. Then, the IDPL server determines whether the end-user has a current session. If a current session does not exit, one is created. In a particular embodiment, the creation of a session includes creating an entry in the Active Session Database Table for this particular end-user. If the end-user has a current session, the Session Refresh column is updated with the current date and time.

In a particular embodiment, this information is pulled from the Active Sessions Database Table. Further, in a particular embodiment, a query is performed against the Active Session to Identity Provider Mapping Database Table in order to determine whether the first identity provider server is already associated with this end-user session. If the end-user is already associated with the first identity provider server, the mapping is removed. In other words, the record mapping the active end-user session to the first identity provider server is deleted. If there is no existing mapping, no action is taken.

Continuing to step 606, the IDPL server redirects the end-user browser to the first identity provider server by transmitting an encoded URL, e.g., https://www.IDP1.com/DeleteResponse?{Encrypted Payload}, to the end-user browser. In a particular embodiment, the encoded URL includes the first identity provider server domain name, the request type (Set Response), and an encrypted payload. The encrypted payload contains a time stamp to guard against replay attacks. Next, at step 608, the end-user browser sends the encoded URL response to the first identity provider server. At step 610, the first identity provider server decodes and validates the response. If the response message is invalid, processing stops and the first identity provider server sends an error response message to the end-user browser. In a particular embodiment, when the response is valid, the rest of the processing conforms to the existing ID-FF protocol specification for identity provider server initiated single sign-off. Proceeding to step 612, the first identity provider server notifies the end-user that the logout has been successful.

Figure 7:
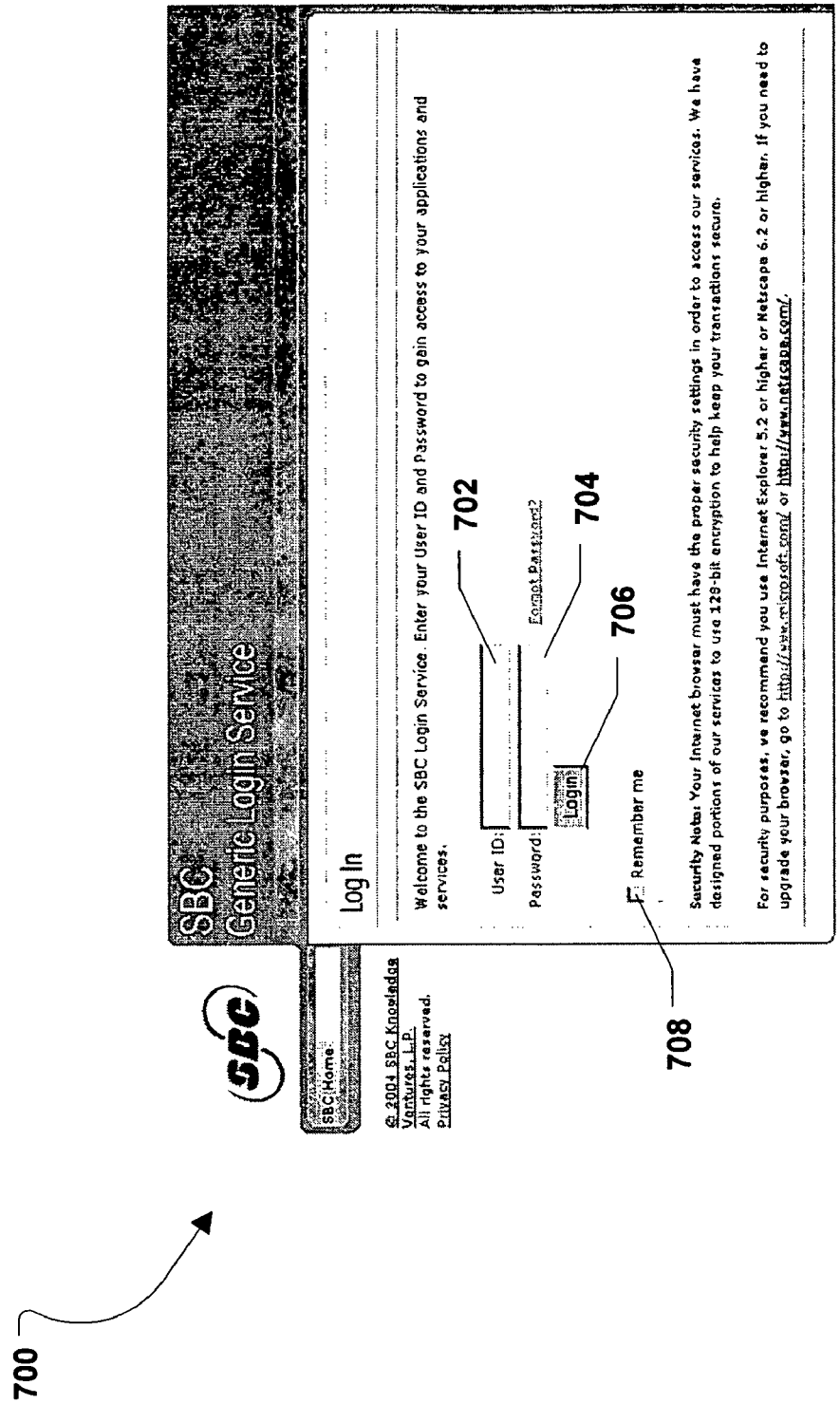
FIG. 7 is a diagram representative of an intelligent login form.

FIG. 7 depicts an intelligent form, designated 700. As illustrated in FIG. 7, the intelligent form 700 includes a user identification input field 702 and a password input field 704. Further, the intelligent form 700 includes a login button 706 that can be toggled or otherwise selected to post the intelligent form 700 at a service provider server. FIG. 7 also shows that the intelligent form 700 includes a remember me selection field 708 that can be selected to indicate to the service provider to remember the posted values for the particular end-user.

In a particular embodiment, the intelligent login form 700 can be used when a service provider server does not know which, if any, identity provider to use to authenticate an end-user. Further, the intelligent login form 700 can be used in a situation in which a service provider server receives a Locate Response from an IDPL server that contains an empty identity provider server list.

Referring to FIG. 8, a sample JavaScript subroutine is shown. In a particular embodiment, the JavaScript routine can be embedded in the body of the HTML fragment for the login screen (intelligent login form 700). The function name, shown in bold as fLoginForm( ), should match the onSubmit clause in the form tag in the HTML fragment, shown in FIG. 9, described below. In a particular embodiment, the JavaScript subroutine gets the value of the username (User ID) by accessing the username field in the login form (document.loginForm.username.value). The username can be matched against patterns using regular expressions.

When a match is found, the URL of the web site where the form gets posted is changed. The URL can be set by changing the value of the action clause in the form tag in the HTML fragment. In the JavaScript subroutine, the action clause value is set by changing the value of the document.loginForm.action variable. On the other hand, when a match is not found, the action clause value is not set and uses the action clause value from the form tag in the HTML fragment. In an exemplary embodiment, a default URL directs the end-user to a web page at the service provider server that provides reasonable error handling. In a particular embodiment, the URL set within the JavaScript subroutine for a true identity provider server includes the correct encoding to support a federated authentication request from a service provider to an identity provider server. When the JavaScript subroutine determines that the login request is for an account local to the service provider server, the URL is set to the login page on the service provider server.

FIG. 9 shows an illustrative HTML fragment that defines a login form. In a particular embodiment, the HTML fragment includes a form tag. In an exemplary embodiment, the form tag has a number of clauses. For example, an onSubmit clause triggers the execution of the JavaScript subroutine, e.g., fLoginForm( ), at the point where the end-user clicks on the login button. In a particular embodiment, the JavaScript changes the URL where the username and password get posted.

Figure 10:
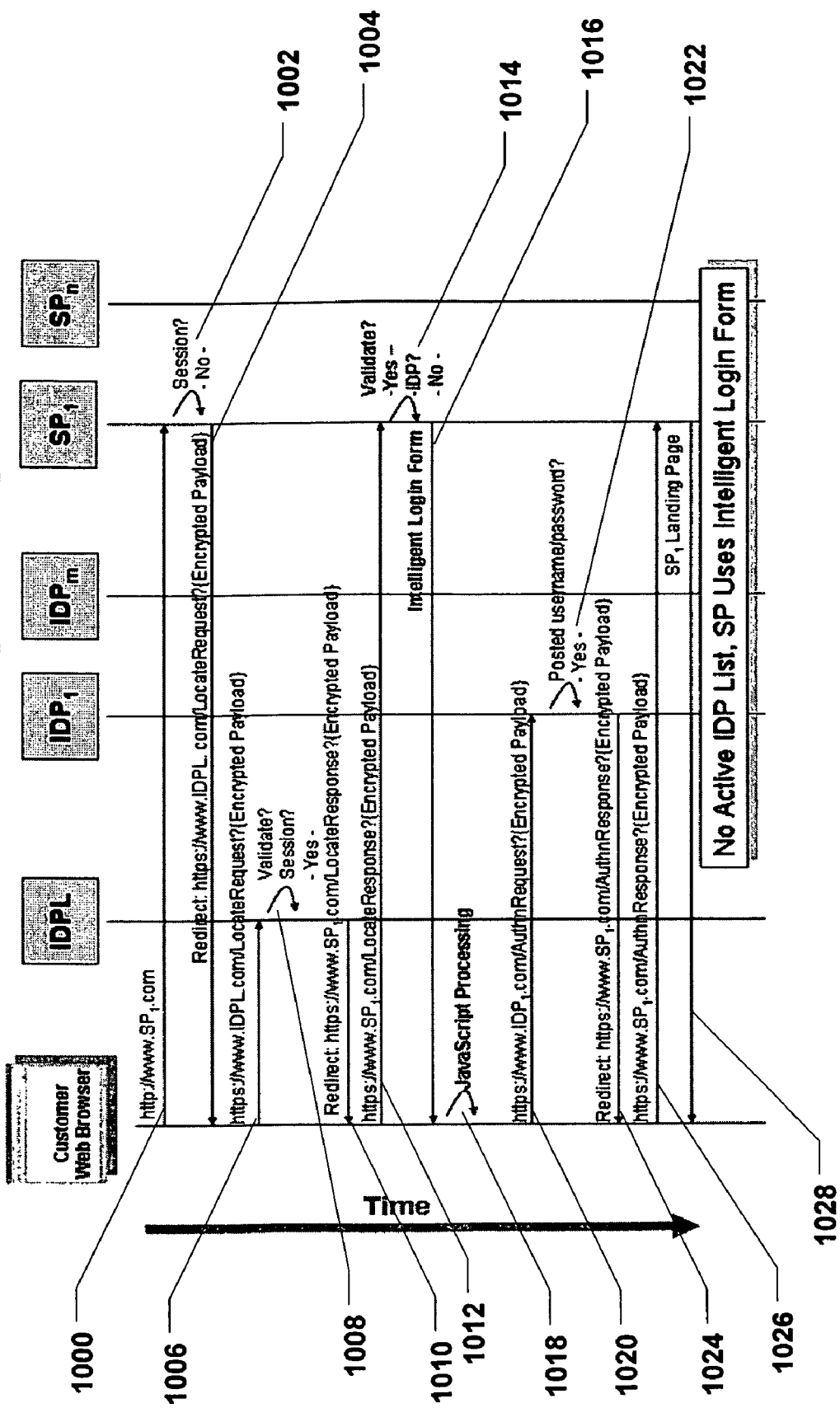
FIG. 10 is a ladder diagram to illustrate a method of using an intelligent login form to submit an authentication request.

Referring to FIG. 10, a method of using an intelligent login form to submit an authentication request to a website is depicted as a ladder diagram. The correct website can be a website provided by an identity provider server or a website provided by a service provider server. In a particular embodiment, the method shown in FIG. 10 operates under the assumption that the end-user does not have active single sign-on session with at least one identity provider server that serves a service provider server. The method also operates under the assumption that the IDPL server is configured with the correct identity provider to service provider mappings in the static configuration database tables within the IDPL server. Additionally, the method shown in FIG. 10 operates under the assumption that cookies are used to manage end-user browser sessions.

Commencing at step 1000, the end-user attempts to access a protected application or service provided at a web site provided by a first service provider server. In a particular embodiment, the end-user can select a link or type a URL into the end-user browser, e.g., http://www.SP1.com. At step 1002, the first service provider server determines whether the end-user has a valid login session. When the end-user does not have a login session, the first service provider server determines which identity provider server within a plurality of identity provider servers to use to authenticate the end-user.

Moving to step 1004, the first service provider server responds to the end-user browser with a redirect message, e.g., https://www.IDPL.com/LocateRequest?SP-ID=SP1&{Encrypted Payload}. In a particular embodiment, the redirect message is designed to request a list of valid identity provider servers from the IDPL server. In a particular embodiment, the redirect message can use secure socket layer (SSL) such that the request cannot be easily captured by unknown third parties. In an illustrative embodiment, the redirect URL provides information on the type of request (Locate Request), a service provider server identifier, and an encrypted payload, e.g., a security assertion markup language (SAML) assertion.

The service provider server identifier indicates to the IDPL server which service provider server is making the request. The IDPL server can compare the service provider server identifier to values listed in a Service Provider Database table within the IDPL server in order to identify the service provider server. In a particular embodiment, the encrypted payload contains a time stamp and a fully qualified domain name (FQDN). The time stamp can be used to make replay attacks harder. The FQDN can be compared with the values within the Service Provider database table in order to validate the domain name. The IDPL server can use a Decryption Method and Decryption Key from the Service Provider Database Table to decrypt the encrypted payload.

Proceeding to step 1006, the end-user browser acts on the redirect message and accesses the IDPL server. The IDPL server uses cookies to get session information or create a new session. If a session already exists, the cookie exchange will yield a session identifier that matches the value in the Active Session String column of the Active Sessions Database Table. The Session Refresh column in the Active Sessions Database Table is updated to reflect the current time. If a session doesn't already exist, a cookie is placed on the end-user browser containing a new unique random session identifier. This session identifier is inserted into the Active Sessions Database Table along with the current date/time in both the Session Start and Session Refresh columns. If a session already exists, the Session Refresh column in the Active Sessions Database Table is updated with the current date/time.

At step 1008, the IDPL server decodes the URL into the request type (Locate Request), the service provider server identifier to identify the service provider server that is making the request, and the encrypted payload. In a particular embodiment, the service provider server identifier is used to access the Service Provider Database Table using the Name column. Also, in a particular embodiment, the Decryption Method and Decryption Key are used to decrypt the encrypted payload into a timestamp and a fully qualified domain name (FQDN). If the service provider server identifier or the encrypted payload is invalid, the IDPL server responds to the end-user browser with a hypertext markup language (HTML) page to indicate to the end-user that an error has occurred.

Moving to step 1010, the IDPL server transmits a redirect URL to the end-user browser, e.g., https://www.SP1.com/LocateResponse?{Encrypted Payload}. In a particular embodiment, the IDPL server creates a Locate Response in the form of a redirect using the FQDN provided in the encrypted payload of the request. Additionally, the URL used in the redirect contains the FQDN, a Locate Response indicator, and an encrypted payload. The encrypted payload can be encoded using the SAML specification. In a particular embodiment, the encrypted payload is encrypted using the Encryption Method and Encryption Key from a corresponding service provider server entry in the Identity Provider Database Table. The payload contains a timestamp and an ordered list of identity provider servers. When there are no identity provider servers associated with the end-user session, the list has zero elements in it.

In a particular embodiment, the identity provider server list is ordered so that the most recent identity provider server associated with the end-user is shown first. In other words, the list is in descending order of the Active Session to Identity Provider Mapping Database Table Mapping Start column. In the present example, the first identity provider server is registered as the most recent identity provider server. Therefore, the first identity provider server is the first identity provider server on the list. In a particular embodiment, an identity provider server is provided when the identity provider server has registered itself as an identity provider server for this end-user on the IDPL server and when the IDPL server static configuration database tables have a valid mapping between first service provider server and the first identity provider server.

Continuing to step 1012, the end-user browser receives the redirect request, e.g., https://www.SP1.com/LocateResponse?{Encrypted Payload}. Then, the end-user browser automatically redirects to the first service provider server and delivers the locate response message from the IDPL server to the first service provider server. In a particular embodiment, the first service provider server uses a cookie exchange to associate this particular inbound request with a session. At step 1014, the first service provider server decodes and validates the locate response message. The first service provider server decrypts the encrypted payload and validates the timestamp to be within specification guarding against a replay attack. As stated above, the returned identity provider server list contains the first identity provider server as the first entry in the ordered list.

In a particular embodiment, the first service provider server determines whether the end-user has a valid login session or not. Typically, the first service provider server would not have made the original locate request if the end-user was already authenticated. However, this validation is performed to verify that nothing abnormal is occurring. If the user already has a login session on the first service provider server, then the first service provider server returns an error message to the end-user and closes the session. If the end-user does not have a valid login session, the first service provider server authenticates the end-user using the first identity provider server returned by the IDPL server in the identity provider server list.

Moving to step 1016, the first service provider server transmits an intelligent login form, e.g., the intelligent login form described above, to the end-user browser. In a particular embodiment, the intelligent login form includes standard ID-FF authentication requests, e.g., URL requests, that are embedded in the JavaScript subroutine for each of the possible identity provider servers, as shown in the JavaScript example above. Next at step 1018, the JavaScript Subroutine is processed as described above. Proceeding to step 1020, the end-user browser sends the authentication request chosen by the JavaScript to first identity provider server and sends the end-user's username and password in a standard HTTP form data post. In a particular embodiment, the end-user browser sends the following request: https://www.IDP1.com/AuthnRequest?{Encrypted Payload}.

At step 1022, the first identity provider server determines that the end-user has a valid login session. If the end-user does not have a valid login session, the first identity provider server challenges the end-user for a username and password, i.e., credentials, before moving to the step 1024. At step 1024, the first identity provider server formulates a redirecting authentication response, e.g., https://www.SP1.com/AuthnResponse?{Encrypted Payload} and sends it back to the end-user browser. Then, at step 1026, the end-user browser forwards the identity provider server authentication response to first service provider server. The first service provider server decodes the response and creates a login session for the end-user. At step 1028, the first service provider server transmits a landing page, e.g., a first HTML page, to the end-user browser.

With the configuration of structure described above, the system and method of locating identity provider servers provides a way for service provider servers that operate in an environment that includes multiple identity provider servers to determine where to authenticate an end-user. Further, the system and method provides a way for service provider servers operating in an environment that includes one or more identity provider servers and local service provider server logins to determine where to authenticate an end-user. The system and method described herein is consistent with the security model inherent in federated identity management. Further, each of the embodiments described herein can operate within various federated identity management schemes. Also, the system and method described herein is transparent to the end-users.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An identity provider locator (IDPL) server comprising:
   an interface to a data network to communicate with a plurality of identity provider servers and to communicate with a plurality of service provider servers;
   a processor; and
   a computer-readable medium accessible to the processor, the computer-readable medium including:
      a list of the plurality of identity provider servers;
      a list of the plurality of service provider servers, wherein each service provider server is associated with an identifier; and
      mappings between the plurality of identity provider servers and the plurality of service provider servers, wherein a list of identity provider servers associated with a particular service provider server is determined based on the identifier associated with the particular service provider server,
   wherein a first list of identity provider servers associated with a first service provider server of the plurality of service provider servers is provided to the first service provider server in response to a request an end-user computer to access the first service provider server, the first list of identity provider servers determined based on a first identifier associated with the first service provider server, and wherein the first list of identity provider servers is provided to the first service provider server without being stored as cookie information at the end-user computer.

2. The server of claim 1, wherein the computer-readable medium further includes a list of end-user sessions and mappings to identity provider servers associated with the list of end-user sessions.

3. A method comprising:
   receiving, at an identity provider locator (IDPL) server, a redirect message from an end-user computer, the redirect message having been received at the end-user computer from a service provider server in response to an end-user accessing the service provider server from the end-user computer, wherein the redirect message includes an identifier of the service provider server;
   determining, at the IDPL server, a list of identity provider servers associated with the service provider server based on the identifier included in the redirect message; and
   transmitting a redirect uniform resource locator (URL) from the IDPL server to the end-user computer, wherein the redirect URL includes the list of identity provider servers associated with the service provider server, wherein the list of identity provider servers is provided to the service provider server via the end-user computer without the list of identity provider servers being stored as cookie information at the end-user computer.

4. The method of claim 3, wherein the redirect message further includes:
   information including a type of request; and
   an encrypted payload.

5. The method of claim 4, wherein the encrypted payload includes a timestamp and a fully qualified domain name (FQDN).

6. The method of claim 5, wherein the redirect URL transmitted to the end-user computer includes the FQDN and a second encrypted payload, wherein the second encrypted payload includes the list of identity provider servers associated with the service provider server, and wherein the list of identity provider servers associated with the service provider server includes an ordered list of identity provider servers.

7. The method of claim 6, wherein the second encrypted payload further includes a timestamp.

8. The method of claim 6, wherein the ordered list of identity provider servers is ordered so that a most recent identity provider server associated with the end-user computer is listed first.

9. The method of claim 6, wherein each of the identity provider servers in the ordered list of identity provider servers is registered at the IDPL server as an identity provider server.

10. A method comprising:
    accessing a service provider server from an end-user computer;
    receiving a redirect message at the end-user computer from the service provider server in response to the end-user computer accessing the service provider server, wherein the redirect message includes a request for a list of identity provider servers from an identity provider locator (IDPL) server, wherein the redirect message includes an identifier of the service provider server;
    delivering the redirect message from the end-user computer to the IDPL server;
    receiving a redirect response at the end-user computer from the IDPL server, wherein the redirect response includes an ordered list of identity provider servers associated with the service provider server determined based on the identifier of the service provider server; and
    delivering the redirect response from the end-user computer to the service provider server without storing the ordered list of identity provider servers as cookie information at the end-user computer.

11. The method of claim 10, wherein the redirect message further includes:
    information including a type of request; and
    an encrypted payload including a timestamp and a fully qualified domain name (FQDN).

12. The method of claim 11, wherein the redirect response includes the FQDN and a second encrypted payload, and wherein the second encrypted payload includes a second timestamp and the ordered list of identity provider servers.

13. The method of claim 10, wherein the service provider server is accessed in response to an end-user interacting with a web browser at the end-user computer, and wherein the ordered list of identity provider servers is ordered so that a most recent identity provider server associated with the end-user is listed first.

14. The method of claim 13, wherein each of the identity provider servers in the ordered list of identity provider servers is registered at the IDPL server as an identity provider server for the end-user.

* * * * *